United States Patent [19]

Kordesch

[11] 4,105,830
[45] Aug. 8, 1978

[54] AIR DEPOLARIZED CELL
[75] Inventor: Karl Victor Kordesch, Lakewood, Ohio
[73] Assignee: Union Carbide Corporation, New York, N.Y.
[21] Appl. No.: 820,616
[22] Filed: Aug. 1, 1977
[51] Int. Cl.² .............................................. H01M 8/00
[52] U.S. Cl. ...................................................... 429/27
[58] Field of Search ......................................... 429/27
[56]  References Cited
U.S. PATENT DOCUMENTS

| | | | |
|---|---|---|---|
| 3,855,000 | 12/1974 | Jammet | 429/27 |
| 3,871,920 | 3/1975 | Grebier et al. | 429/27 |

Primary Examiner—John H. Mack
Assistant Examiner—H. A. Feeley
Attorney, Agent, or Firm—Eugene Lieberstein

[57] ABSTRACT

The air depolarized cell comprises a laminated cathode assembly including an air cathode and an auxiliary cathode in combination with a layer of a thin film nonporous gas permeable membrane which is disposed with one side over the air cathode and with the opposite side having substantially unrestricted access to the atmosphere through a gas diffusion member. The nonporous membrane controls the transfer of oxygen from the ambient atmosphere to the air cathode exclusively by gas solubility with its permeability to oxygen selected to correspond to a predetermined average current density for the cell.

13 Claims, 3 Drawing Figures

U.S. Patent     Aug. 8, 1978     4,105,830
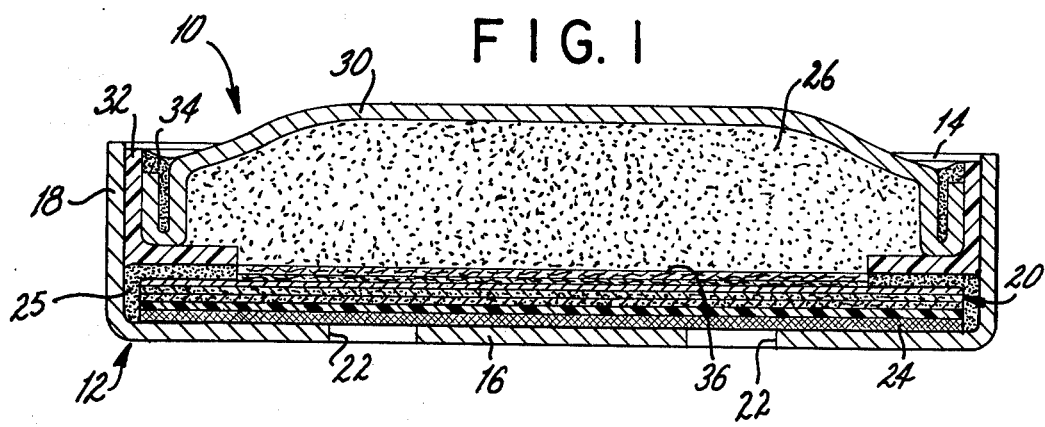
FIG. 1
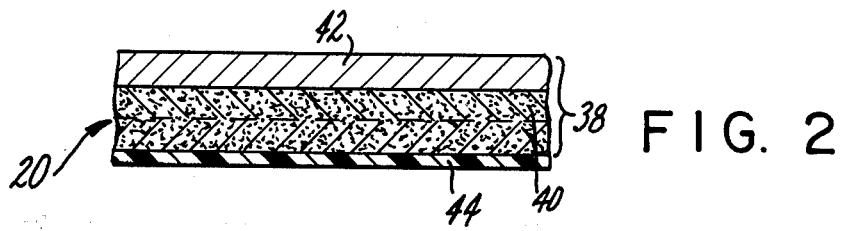
FIG. 2
FIG. 3
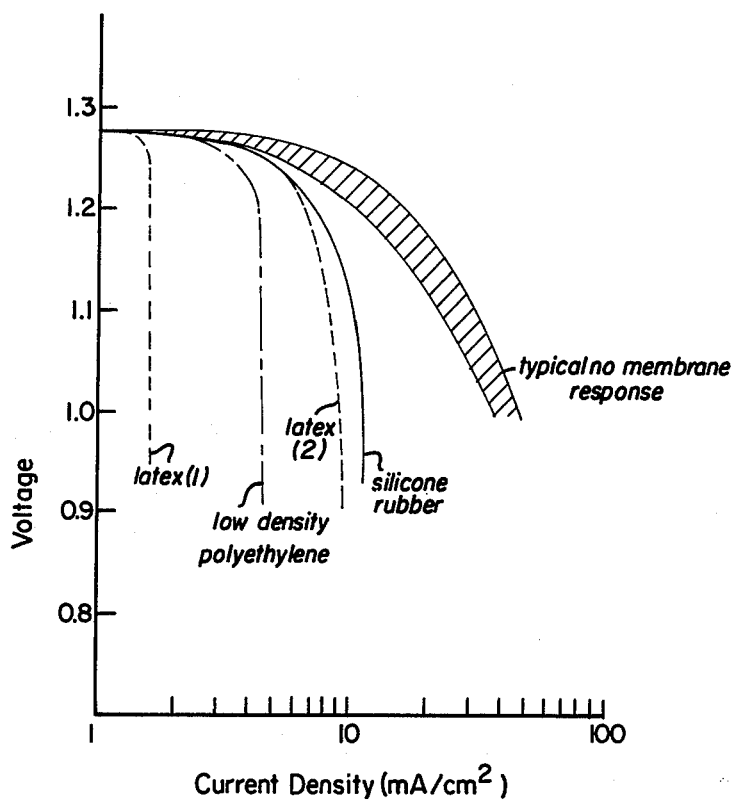

AIR DEPOLARIZED CELL

This invention relates to miniature metal air cells and more particularly to an improved metal air cell construction which permits relatively high average current density operation with a high pulse current capability.

Air-depolarized cells, i.e., cells in which the active cathode material is oxygen gas obtained from ambient air, have the advantages of high ampere hour capacity and low cost. However, the necessary air access to the cathode, and hence to other internal components of the cell, exposes the cell to the relative humidity of the surrounding atmosphere. If the humidity of the ambient air is low, moisture will escape from the cell decreasing the volume of electrolyte and ultimately causing dessication. Conversely, if the humidity of the air is high the cell will gain water diluting the electrolyte and eventually flooding the cell. Moreover, the free and unrestricted access of air to the cell may result in wasteful anode corrosion and the ingress of $CO_2$ in cells employing an alkaline electrolyte can cause carbonation of the alkaline electrolyte.

To minimize these problems it is necessary to control the passage of atmospheric air into the cell. Heretofore this was accomplished by means of restricted openings (pin holes) in the cell outer casing. In addition, most prior art cell constructions incorporate a layer of a porous hydrophobic material such as a porous polytetrafluoroethylene film to further restrict the admission of air and to limit the passage of water vapor. Unfortunately, the restricted access of ambient air in such manner also limits the average current density attainable allowing for only very low current drain applications.

The present invention is directed to an air depolarized cell construction which is particularly suited to miniature cell sizes, has an extended shelf life, can deliver a high average current, and is capable of providing a high peak current. Broadly stated, the high average current density is attained through the use of a nonporous gas permeable thin film membrane disposed with one side over the air cathode and with the opposite side having substantially unrestricted access to the atmosphere through a gas diffusion member. The gas permeable membrane is selected with an oxygen transfer rate tailored to the average current density requirement for the cell. The disposition of the membrane in relation to the gas diffusion member permits a flow of oxygen through the membrane which is uniformly dispersed over the entire gas surface of the air cathode. The membrane is intended to serve as the principal means in the cell for controlling the transfer of oxygen from the ambient atmosphere to the air-cathode surface and to function as a barrier to water vapor. In the latter regard it is critical to the present invention that the membrane be nonporous.

In accordance with the present invention, the passage of oxygen through the nonporous membrane occurs exclusively by gas permeation which involves a solubility mechanism which is chemical in nature as opposed to simple physical diffusion through a porous member. There are many conventional nonporous materials which to varying degrees are selectively permeable to oxygen. Such materials are known in the literature and their rate of oxygen permeability can be readily ascertained.

A further embodiment of the present invention relates to a construction variation of the cell permitting very high peak currents over relatively short demand periods. In accordance with the present invention the high peak current capability is provided by means of an auxiliary cathode in the form of a thin layer disposed in both electrical and physical contact with the air cathode. The composition of the auxiliary cathode depends upon the choice of electrolyte system. For an aqueous alkaline electrolyte the auxiliary cathode should be reducible metal oxide which can be recharged at the potential of the air cathode. Examples of satisfactory reducible metal oxides are manganese dioxide, molybdenum oxide, vanadium pentoxide, cobalt oxide and copper oxide. For acidic and neutral electrolytes the auxiliary cathode can be an organic compound having reversible redox properties and having the capability of being recharged at the air cathode potential. Examples of such materials are quinones and substituted quinones such as chloranil (tetrachloro-p-benzoquinone). Examples of neutral electrolytes are aqueous solutions of ammonium chloride, manganese chloride or a mixture of manganese chloride and magnesium chloride. Aqueous solutions of zinc chloride or mixtures of zinc chloride and ammonium chloride are suitable as acidic electrolytes.

Other features and advantages of the present invention will be apparent from the following detailed description of a preferred embodiment when taken in conjunction with the accompanying figures of which:

FIG. 1 is a cross-sectional view of the air depolarized cell of the present invention;

FIG. 2 is an enlarged illustration of the cathode assembly of FIG. 1; and

FIG. 3 is a series of curves showing the effects of various nonporous thin film membranes in controlling oxygen access to the air cathode in FIG. 1.

The air cell illustrated at 10 in FIG. 1 comprises a container 12, of for example nickel plated steel, which forms a partial enclosure having an open top 14, a relatively flat bottom wall 16 and an upstanding cylindrical wall portion 18. A cathode assembly generally designated at 20 lies within the container 12. A spacer element 24, preferably a porous structure such as an open grid or screen of any suitable material, of for example nylon, is located between the bottom wall and the cathode assembly 20. The bottom wall 16 includes at least one air passageway 22 of sufficient size to provide the cathode assembly 20 with free unrestricted access to the atmosphere through the spacer element 24.

The spacer element 24 provides mechanical support for the cathode assembly 20 and serves as a gas diffuser between the external atmosphere and the cathode assembly 20. Alternatively, instead of a separate gas diffuser, a gas space may be structurally maintained between the bottom wall 16 and the cathode assembly 20 by means, for example, of a crimp in the wall portion 18 of the container 12. The cathode assembly 20 and spacer element 24 are affixed to the container 12 by means of an adhesive material, preferably a silver epoxy 25. The silver epoxy 25 functions as an adhesive seal and assures adequate electrical contact between the cathode assembly 20 and the container 12 when the container serves as the external cathode contact. If the spacer element 24 is conductive the silver may be omitted from the epoxy provided electrical contact is made between the air cathode and the spacer element 24.

An anode 26, which can consist of a conventional porous mass of a suitable metal powder, e.g., a gelled amalagamated zinc powder or a sintered zinc compact, is situated above the cathode assembly 20 within a compartment formed by a second container 30. The second container 30 may be constructed of a metal and serve as the negative terminal of the cell 10. The second container 30 is positioned within the upstanding wall portion 18 of the container 12 and is secured thereto through a gasket 32 and/or by means of an adhesive 34 such as an epoxy. The gasket 32 should be of an insulating material when the two containers 12 and 30 respectively are metal.

The anode 26 is separated from the cathode assembly 20 by a separator 36 preferably consisting of more than one layer of material. When two layers are used as the separator 36 each may be constructed from a fibrous cellulose material or only one constructed from such material while using any conventional standard synthetic fabric for the other layer. An aqueous electrolyte solution is added to the cell during assembly. A suitable alkaline electrolyte can be aqueous KOH or NaOH and a suitable electrolyte for cells using an organic redox system include an aqueous solution of zinc chloride and mixtures of zinc chloride and ammonium chloride. A substantially neutral electrolyte system may include ammonium chloride or manganese chloride or a mixture of manganese chloride and magnesium chloride solution.

The cathode assembly 20, as is more clearly shown in FIG. 2, comprises, a laminate cathode structure 38 including an air cathode 40 and an auxiliary cathode 42 in combination with a layer of a thin film gas permeable membrane 44. The thin film gas permeable membrane 44 lies on the gas side of the air cathode 40 and has essentially unrestricted access to the atmosphere. It should be noted, however, that it is not necessary to have the nonporous membrane 44 lie contiguous to the cathode 40. Nevertheless, this arrangement is preferred for simplicity of manufacture. The membrane 44 may be mechanically placed over the air cathode 40, cast directly onto its surface or sprayed onto its surface from a liquid solution thereof. As an alternate embodiment, the membrane 44 can be placed or cast on the interior surface of the porous spacer element 24 facing the air cathode 40 thereby allowing the spacer to also serve as the bottom wall of the container 12.

The membrane 44 is composed of a polymer selected with an oxygen permeability suitable for providing a predetermined oxygen flow into the cell 10 corresponding to the average current density requirement for the cell 10. Various nonporous membrane materials are known to permit oxygen to permeate at different rates according to their chemical structure. Table I, shown below, is a compilation of a large number of different polymer materials in decreasing order of the rate of oxygen permeability compared under the same test conditions. A wide range of permeabilities readily permit selection of materials to meet the output current drain of the cell in accordance with the present invention. The compilation in Table I was derived from a paper entitled "Thin Silicone Membranes," published in the Annals of the New York Academy of Sciences in volume 146, page 119. Although variation in membrane thickness will affect its permeability this is not as critical a factor as the chemical structure of the polymer. However, the present invention does contemplate selecting an appropriate oxygen permeability tailored to the current requirements for the cell by choice of polymer and thickness. For a miniature cell the practical range of preferred thickness should lie between about 0.0001 and 0.002 inch (from about 0.00026 cm to about 0.0051 cm).

TABLE I

| POLYMER | RELATIVE PERMEABILITY VALUE |
|---|---|
| Dimethyl silicone rubber | 60 |
| Fluorosilicone | 11 |
| Nitrile silicone | 8.5 |
| Natural rubber | 2.4 |
| Ethyl cellulose | 2.1 |
| Polyethylene, low density | 0.8 |
| BPA polycarbonate | 0.16 |
| Butyl rubber | 0.14 |
| Polystyrene | 0.12 |
| Polyethylene, high density | 0.1 |
| Cellulose acetate | 0.08 |
| Methyl cellulose | 0.07 |
| Polyvinyl chloride | 0.014 |
| Polyvinyl alcohol | 0.01 |
| Nylon 6 | 0.01 |
| Polyvinylidene fluoride | 0.003 |
| Mylar | 0.0019 |
| Kel-F (unplacticized) | 0.001 |
| Vinylidene chloride-vinyl chloride | 0.0005 |
| Teflon | 0.0004 |

The rate of which $O_2$ will pass through a membrane 44 with a known oxygen permeability can be tailored to the required current drain for the cell in the following manner:

For example:
 1 mole $O_2$ = 22.4 liters (at STP); equivalent to 96,500 coulombs or 26.8 Ah, based on a 1-electron reaction (1 coulomb = 1 Asec., therefore 96,500/3600 = 26.8 Ah)
 22,400 ml $O_2$ would produce 53.6 Ah or 53,600 mAh based on the following 2-electron reaction:

$$O_2 + 2H^+ + 2e^- = H_2O_2$$

Therefore, 22.4 ml $O_2$ would produce 53.6 mAh or 22.4/53.6 = 0.418 ml $O_2$/mAh.
This means that, for an apparent cathode area of 1 $cm^2$ on a $1-mA/cm^2$ drain,
 0.418 ml $O_2$/hr would be required or
 0.418 ml $O_2$/hr to operate at 0.1 $mA/cm^2$ (100 $\mu A/cm^2$) or
 0.004 ml $O_2$/hr to operate at 0.01 mA (10 $\mu A$)/$cm^2$.

High density polyethylene has been experimentally shown to provide a suitable permeability for either the 0.1 $mA/cm^2$ or the 0.01 $mA/cm^2$ (10 $\mu A/cm^2$) current drain conditions which are typical of most watch batteries. For the 1-3 $mA/cm^2$ continuous operation conditions, typical in hearing aid batteries, low density polyethylene may be employed.

The air cathode 40 is preferably a multi-layered composite structure which may be of the metal-carbon type for alkaline and neutral electrolyte systems and an all-carbon air electrode for acid electrolyte systems. The use of a catalyst is not essential particularly for the all-carbon air electrode. Typical multi-layer fuel cell electrode structures which may be used in the present invention are shown and described in U.S. Pat. No. 3,423,247 and U.S. Pat. No. 3,556,856 respectively, the disclosures of which are incorporated herein by reference. A two-layered composite electrode may consist of a wetproofed porous nickel current collector layer facing the electrolyte side and a catalyzed carbon layer. Alternatively, the porous nickel structure may face the electrolyte side without wetproofing. The wetproofing is preferably accomplished using polytetrafluoroethylene although other wetproofing compositions may be used as is well known in the art. The wetproofing composition of, for example, an aqueous emulsion of polytetrafluoroethylene may be sprayed on or intermixed with the catalyzed carbon in the formation of the catalyzed carbon layer. The wetproofing composition may also be built up to form an independent hydrophobic layer. In such case the hydrophobic layer must be porous to permit the transport of oxygen gas to the carbon layer. A three-layered fuel cell type electrode may be formed by including a very coarse pore nickel layer intermediate the catalyzed carbon layer and a relatively fine pore nickel layer. Wetproofing of the carbon layer is necessary.

FIG. 3 shows the effect of various membranes on oxygen control relative to the performance without a membrane for a test cell using a wetproofed porous nickel current collector layer and a wetproofed porous carbon layer for the air cathode. For test purposes the carbon layer did not contain a catalyst. One can clearly observe the controlled sharp current density limitation of the cell established by the selection of membrane as compared to the same cell without the membrane. The rate of permeability of the material to oxygen may also be adjusted for a given material by a change in thickness. The curve for the latex No. 2 membrane (a neoprene latex) indicates the effect on the permeability of latex due to a decrease in membrane thickness when compared with the curve for the latex No. 1 membrane which was also a neoprene latex but was thicker.

The auxiliary cathode 42 consists of a thin coherent layer composed of a material selected according to the electrolyte system. For an aqueous alkaline system the preferred auxiliary cathode is a layer of MnO₂ and for an acidic or neutral electrolyte system the preferred auxiliary cathode is a layer of chloranil. The thickness of the auxiliary cathode layer should preferably lie between about 0.01 – 0.05 inch (0.0256 – 0.128 cm). The auxiliary cathode layer 42 is preferably bonded to the surface of the air cathode 40 to form the laminate multi-layer cathode structure 38. A coherent bonded MnO₂ electrode of the type which may be used in the present invention is disclosed in U.S. Pat. No. 3,945,847 issued to Kordesch et al. in March, 1976. The MnO₂ bonded electrode is composed of particulate manganese dioxide in combination with an electrically conductive material such as colloidal carbon black and a suitable polymer binder such as polymethyl methacrylate, polysulfone and epoxy resins. The chloranil layer can be formed from a composition of powdered chloranil, a conductive material such as graphite and a suitable binder.

The auxiliary cathode 42 is incorporated in the multi-layer cathode structure 38 facing the separator 36 on the electrolyte side of the cell 10. Since the air electrode is at a higher potential than the auxiliary electrode, the air electrode will maintain the auxiliary electrode in a charged condition under all cell conditions when the oxygen supply is larger than the oxygen consumption. Thus, the auxiliary electrode is available to permit the cell 10 to deliver for a limited duration a pulse current higher than the air cathode is capable of supplying. The auxiliary electrode will be substantially recharged by the air cathode if sufficient time elapses before the high pulse current is again demanded.

What is claimed is:

1. An air depolarized cell comprising:
   an anode confined within a first container;
   a cathode assembly comprising an air cathode having one surface juxtaposed in close relationship to said anode and a nonporous thin film membrane lying adjacent an opposite surface of said air cathode for controlling the flow of oxygen thereto;
   separator means disposed between said cathode assembly and said anode;
   a second container disposed about said cathode assembly and having at least one air passageway, said air passageway being spaced apart from said nonporous thin film membrane and being of sufficient size to provide said membrane with substantially unrestricted access to the atmosphere;
   said nonporous thin film membrane permitting oxygen to pass therethrough exclusively by gas solubility and with its permeability to oxygen selected to correspond to a predetermined average current density for said cell;
   an electrolyte solution contained within said cell; and
   means for sealing said first and second container to prevent electrolyte leakage from said cell.

2. An air depolarized cell as defined in claim 1 further comprising a gas diffusion member located between said air passageway and said membrane.

3. An air depolarized cell as defined in claim 2 wherein said cathode assembly is a laminated structure comprising in addition an auxiliary cathode layer disposed on the side of said cathode assembly facing said separator.

4. An air depolarized cell as defined in claim 3 wherein said air cathode is a multi-layer fuel cell type electrode.

5. An air depolarized cell as defined in claim 4 wherein said electrolyte solution is alkaline and wherein said auxiliary cathode is a reducible metal oxide selected from the group consisting of manganese dioxide, molybdenum oxide, vanadium pentoxide, cobalt oxide and copper oxide.

6. An air depolarized cell as defined in claim 5 wherein said auxiliary cathode is manganese dioxide.

7. An air depolarized cell as defined in claim 3 wherein said electrolyte solution is acidic and wherein said auxiliary electrode is an organic redox compound having the capability of being recharged at the potential of the air cathode.

8. An air depolarized cell as defined in claim 7 wherein said organic redox compound is selected from the group consisting of quinones and substituted quinones.

9. An air depolarized cell as defined in claim 8 wherein said acidic electrolyte is an aqueous solution selected from the group consisting of zinc chloride and mixtures of zinc chloride and ammonium chloride.

10. An air depolarized cell as defined in claim 8 wherein said auxiliary cathode is composed of chloranil.

11. An air depolarized cell as defined in claim 3 wherein said electrolyte solution is substantially neutral and wherein said auxiliary electrode is an organic redox compound having the capability of being recharged at the potential of the air cathode.

12. An air depolarized cell as defined in claim 11 wherein said substantially neutral electrolyte is an aqueous solution selected from the group consisting of ammonium chloride, manganese chloride and a mixture of manganese chloride and magnesium chloride.

13. An air depolarized cell as defined in claim 12 wherein said auxiliary cathode is composed of chloranil.

* * * * *